United States Patent
Lee et al.

(10) Patent No.: US 10,278,465 B2
(45) Date of Patent: May 7, 2019

(54) ELECTRONIC DEVICE CASE HAVING CONVEX SURFACE CAUSED BY AIR INJECTION, DIARY, AND METHOD FOR MANUFACTURING SAME

(71) Applicants: Mi-sun Lee, Seoul (KR); In Kyu Kim, Seoul (KR)

(72) Inventors: Mi-sun Lee, Seoul (KR); In Kyu Kim, Seoul (KR)

(73) Assignees: Mi-sun Lee, Seoul (KR); In Kyu Kim, Seoul (KR)

(*) Notice: Subject to any disclaimer, the term of this patent is extended or adjusted under 35 U.S.C. 154(b) by 573 days.

(21) Appl. No.: 14/913,291

(22) PCT Filed: Aug. 28, 2013

(86) PCT No.: PCT/KR2013/007733
§ 371 (c)(1),
(2) Date: Feb. 19, 2016

(87) PCT Pub. No.: WO2015/025997
PCT Pub. Date: Feb. 26, 2015

(65) Prior Publication Data
US 2016/0198822 A1   Jul. 14, 2016

(30) Foreign Application Priority Data

Aug. 22, 2013   (KR) .................. 10-2013-0099982

(51) Int. Cl.
*A45C 11/00* (2006.01)
*B42D 3/08* (2006.01)
(Continued)

(52) U.S. Cl.
CPC ............... *A45C 11/00* (2013.01); *A45C 5/02* (2013.01); *B29C 65/002* (2013.01); *B42D 3/02* (2013.01);
(Continued)

(58) Field of Classification Search
None
See application file for complete search history.

(56) References Cited

U.S. PATENT DOCUMENTS 6,213,669 B1   4/2001   Yamamoto

FOREIGN PATENT DOCUMENTS

GB         2555486 A  *  5/2018  ............. B32B 5/022
KR         20-0185181 Y1    6/2000
(Continued)

OTHER PUBLICATIONS

PCT International Search Report, PCT/KR2013/007733, dated Nov. 26, 2013, 4 Pages.

*Primary Examiner* — Barbara J Musser
(74) *Attorney, Agent, or Firm* — Fenwick & West LLP

(57) ABSTRACT

A fabrication method for a diary or electronic device cover, the fabrication method includes the steps of: disposing an elastic first synthetic resin on a joint panel; disposing a second synthetic resin on the first synthetic resin; disposing a third synthetic resin different from the first synthetic resin and the second synthetic resin in material; joining the first synthetic resin, the second synthetic resin, and the third synthetic resin at a plurality of points; and injecting air into a space between the first synthetic resin and the second synthetic resin to allow the cover to have a bulged surface.

7 Claims, 5 Drawing Sheets

(51) Int. Cl.
*B29C 65/00* (2006.01)
*B42D 3/02* (2006.01)
*G06F 1/16* (2006.01)
*A45C 5/02* (2006.01)
*B29L 31/34* (2006.01)

(52) U.S. Cl.
CPC .............. *B42D 3/08* (2013.01); *G06F 1/1656* (2013.01); *A45C 2011/002* (2013.01); *A45C 2011/003* (2013.01); *B29L 2031/34* (2013.01); *G06F 2200/1634* (2013.01)

(56) References Cited

FOREIGN PATENT DOCUMENTS

| KR | 20-0417266 Y1 | 5/2006 |
| KR | 10-2013-0053728 A | 5/2013 |

\* cited by examiner

ELECTRONIC DEVICE CASE HAVING CONVEX SURFACE CAUSED BY AIR INJECTION, DIARY, AND METHOD FOR MANUFACTURING SAME

TECHNICAL FIELD

The inventive concept relates to a case for an electronic device, a diary, or a note, and a fabrication method thereof.

BACKGROUND ART

In recent years, end users are requiring individual designs and additional functions of diaries, notes, or electronic cases, as well as their inherent functions. For example, users are inclined to need more functions and more advanced designs in addition to basic functions for diaries.

Especially, diaries, notes, or electronic devices are frequently used by office men or students. Office men or students may want to use cases of diaries, notes, or electronic devices for pillows or wrist supports.

The inventive concept relates to the technology of providing a better design for a case of a diary, note, or electronic device as well as allowing the case to be used as a pillow or wrist supports.

DISCLOSURE OF THE INVENTION

Technical Problem

Embodiments of the inventive concept provide an electronic device case or diary cover having a bulged surface.

Additionally, embodiments of the inventive concept provide an electronic device case or diary cover having bulged surfaces on both the top and the bottom by injecting air into a first synthetic resin and a second synthetic resin which are elastic. Additionally, as a diary cover or electronic device cover has bulged surfaces on both the top and the bottom, the bulged surface is more solidly designed.

Additionally, embodiments of the inventive concept provide bulged surfaces on both the top and the bottom in a diary cover or electronic device case for rigidity to external impact and improved elasticity.

Additionally, embodiments of the inventive concept provide a groove in a joint panel to facilitate air injection between a first synthetic resin and a second synthetic resin.

Technical Solution

A diary according to an embodiment of the inventive concept includes a plurality of record bundles and a cover enclosing the bundles. The cover includes: a joint panel; an elastic first synthetic resin laid on the joint panel; an elastic second synthetic resin laid on the first synthetic resin; and a third synthetic resin interposed between the first synthetic resin and the joint panel or disposed on the second synthetic resin, and formed different from the first synthetic resin and the second synthetic resin in material. The first synthetic resin, the second synthetic resin, and the third synthetic resin are joined at a plurality of points to allow the cover to have a bulged surface and air is injected into a space between the first synthetic resin and the second synthetic resin.

Air is injected into the space between the first synthetic resin and the second synthetic resin to detach the plurality of points from the joint panel.

The cover comprises the plurality of points detached from the joint panel by expanding the first synthetic resin and the second synthetic resin in opposite directions each other through the air injected into the space between the first synthetic resin and the second synthetic resin.

The first synthetic resin and the second synthetic resin are formed of polyurethane, and the third synthetic resin is formed of polyvinyl chloride.

The first synthetic resin, the second synthetic resin, and the third synthetic resin are joined at the plurality of points and an edge of the joint panel in a high frequency joint mode.

The joint panel includes at least one groove to allow the air to be injected into the space between the first synthetic resin and the second synthetic resin, and the first synthetic resin, the second synthetic resin, and the third synthetic resin are more widely joined at the at least one groove that at other areas.

A fabrication method for a diary or electronic device cover includes the steps of: disposing an elastic first synthetic resin on a joint panel; disposing a second synthetic resin on the first synthetic resin; disposing a third synthetic resin different from the first synthetic resin and the second synthetic resin in material; joining the first synthetic resin, the second synthetic resin, and the third synthetic resin at a plurality of points; and injecting air into a space between the first synthetic resin and the second synthetic resin to allow the cover to have a bulged surface The step of injecting the air into the space between the first synthetic resin and the second synthetic resin is a step of injecting the air into the space between the first synthetic resin and the second synthetic resin to expand the first synthetic resin and the second synthetic resin in opposite directions each other by the air injected into the space between the first synthetic resin and the second synthetic resin.

An electronic device case includes a case support and a cover joined with or detached from the case support. The case support includes a groove for allowing the cover to slide, and the cover includes: a joint panel; an elastic first synthetic resin laid on the joint panel; an elastic second synthetic resin laid on the first synthetic resin; and a third synthetic resin interposed between the first synthetic resin and the joint panel or disposed on the second synthetic resin, and formed different from the first synthetic resin and the second synthetic resin in material. The first synthetic resin, the second synthetic resin, and the third synthetic resin are joined at a plurality of points to allow the cover to have a bulged surface and air is injected into a space between the first synthetic resin and the second synthetic resin.

Air is injected into the space between the first synthetic resin and the second synthetic resin to detach the plurality of points from the joint panel.

Advantageous Effects

Embodiments of the inventive concept provide an electronic device case or diary cover having a bulged surface.

Additionally, embodiments of the inventive concept provide an electronic device case or diary cover having bulged surfaces on both the top and the bottom by injecting air into a first synthetic resin and a second synthetic resin which are elastic. Additionally, as a diary cover or electronic device cover has bulged surfaces on both the top and the bottom, the bulged surface is more solidly designed.

Additionally, embodiments of the inventive concept provide bulged surfaces on both the top and the bottom in a diary cover or electronic device case for rigidity to external impact and improved elasticity.

Additionally, embodiments of the inventive concept provide a groove in a joint panel to facilitate air injection between a first synthetic resin and a second synthetic resin.

BEST MODE FOR CARRYING OUT THE INVENTION

Hereinafter, embodiments of the inventive concept will be described in conjunction with the accompanied drawings.

Figure 1:
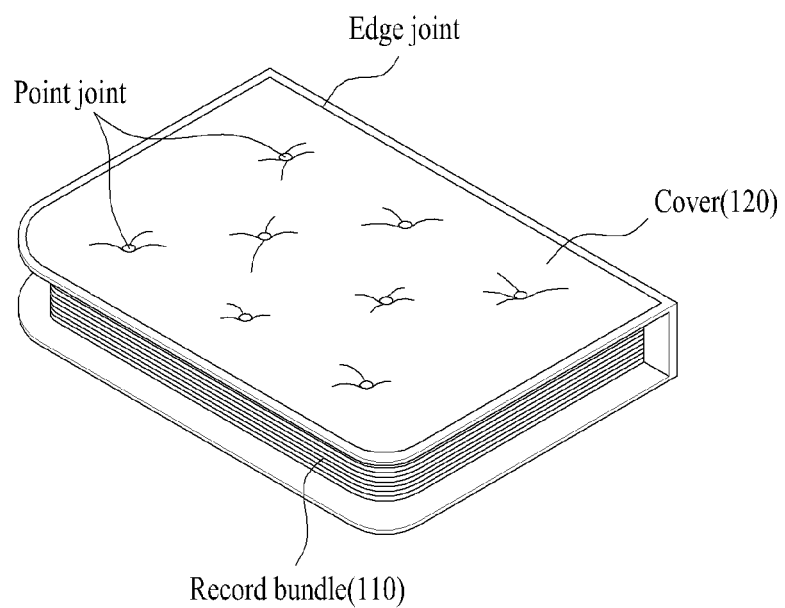
FIG. 1 is a view of a diary according to an embodiment of the inventive concept.

FIG. 1 is a view of a diary according to an embodiment of the inventive concept.

Referring to FIG. 1, a diary includes a record bundle 110 and a cover 120. The diary is portable by a user, as like a note, pocketbook, or book, and means all kinds of matters writable by frindles.

A diary cover according to an embodiment of the inventive concept includes a plurality of bulged patterns. Especially, by injecting air into the inside of the bulged pattern of a diary, a user may use the diary for a pillow or wrist support with cushion.

Especially, a diary cover includes a plurality of points for a plurality of bulged patterns and high frequency joints are formed at those points. Additionally, the inventive concept performs a high frequency joint at the edge of a diary cover to prevent air leakage to the exterior and to maintain bulged patterns on the cover.

Figure 2:
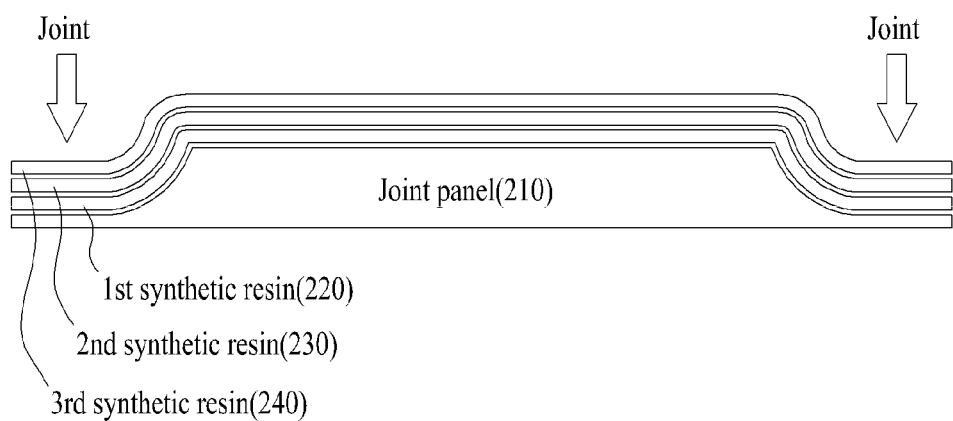
FIG. 2 is a side view of a diary cover including disposition with a joint panel, a first synthetic resin, a second synthetic resin, and a third synthetic resin.

FIG. 2 is a side view of a diary cover including disposition with a joint panel, a first synthetic resin, a second synthetic resin, and a third synthetic resin.

Referring to FIG. 2, a diary cover according to an embodiment of the inventive concept includes a joint panel 210, a first synthetic resin 220, a second synthetic resin 230, and a third synthetic resin 240. For this configuration, a high frequency joint is performed at the edge of the joint panel. Although FIG. 2 is illustrated as the third synthetic resin 240 is disposed on the second synthetic resin 230, the third synthetic resin 240 may be even interposed between the joint panel 210 and the first synthetic resin 220.

The joint panel 210 may be formed of a laminated paper or a rigid plastic. The first synthetic resin 220 is laid on the joint panel 210 and the second synthetic resin 230 is laid on the first synthetic resin 220. The first synthetic resin 220 and the second synthetic resin 230 may be formed of an elastic material such as polyurethane.

Additionally, the third synthetic resin 240 may be laid on the second synthetic resin 230, and may be formed of a material lower than the first synthetic resin 220 and the second synthetic resin 230 in elasticity. For example, the third synthetic resin 240 may be formed of polyvinyl chloride, and may be used at the outmost surface of the cover or may be even interposed between the joint panel 210 and the first synthetic resin 220.

As described below, air may be injected between the first synthetic resin 220 and the second synthetic resin 230. During this, the first synthetic resin 220, the second synthetic resin 230, and the third synthetic resin 240 may be jointed each other at a plurality of points. Accordingly, the surface of the cover may have a plurality of bulged patterns as shown in FIG. 1.

However, although the cover surface has a plurality of bulged patterns, the bulged patterns may be differently sensed by users in esthetic appreciation. The inventive concept may form bulged patterns on both the top surface and the bottom surface of the cover, providing more solid shaped with the bulged patterns. Additionally, the inventive concept may raise the plurality of points from the joint panel 210, allowing a user to sense cushion even at the plurality of points.

Figure 3:
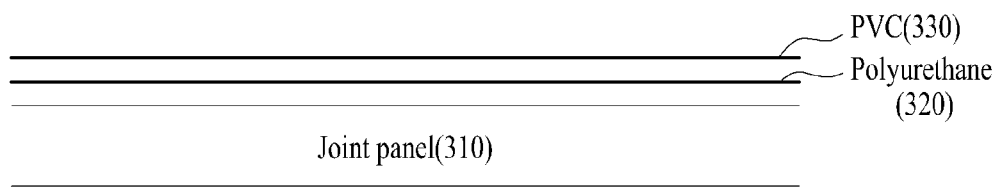
FIG. 3 is a side view for the case of laying only polyurethane and PVC on a joint panel.

FIG. 3 is a side view for the case of laying only polyurethane and PVC on a joint panel.

Referring to FIG. 3, polyurethane 320 is laid on a joint panel 310 and polyvinyl chloride (PVC) 330 is laid on the polyurethane 320. The polyurethane is higher than the PVC 330 in elasticity. The PVC 330 may be also interposed between the polyurethane 320 and the joint panel 310.

Figure 4:
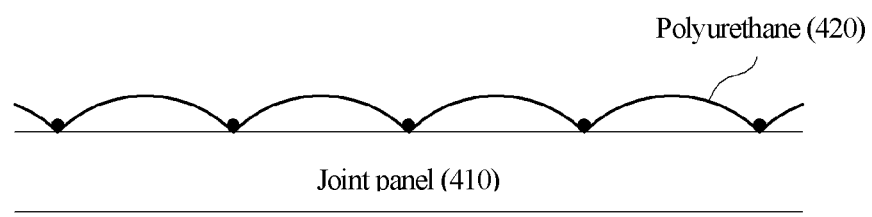
FIG. 4 is a view illustrating that in the case of laying only polyurethane and PVC on a joint panel as shown in FIG. 3, the top surface of the polyurethane is bulged by injecting air into a space between the joint panel and the polyurethane.

FIG. 4 is a view illustrating that in the case of laying only polyurethane and PVC on a joint panel as shown in FIG. 3, the top surface of the polyurethane is bulged by injecting air into a space between the joint panel and the polyurethane.

Referring to FIG. 4, air is injected between a joint panel 410 and polyurethane 420. During this, due to a plurality of points, the top surface of the polyurethane 420 has a plurality of bulged patterns. Because the joint panel 410 is rigid, the polyurethane 420 does not expand downward. Accordingly, the bulged patterns present in the top surface of the polyurethane 420 do not show a considerable solid perception.

Additionally, since the plurality of points do not rise upward from the joint panel 410, it is hard for a user to sense cushion from the plurality of points.

Although PVC 330 is placed under polyurethane 320 and air is injected between the polyurethane 320 and the PVC 330, it is difficult to raise the points. This is because the polyurethane 320 has high elasticity but the PVC 330 has low elasticity.

Figure 5:
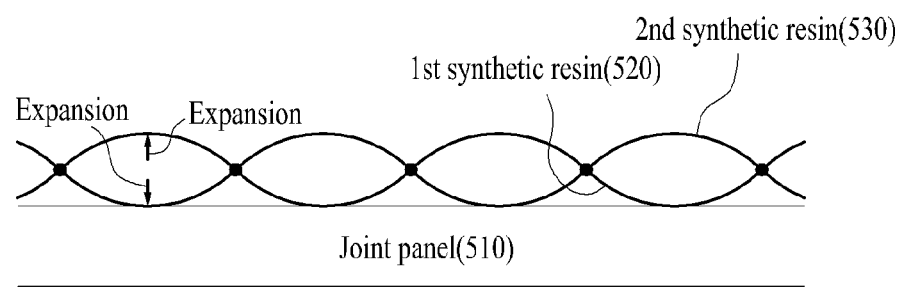
FIG. 5 is a view illustrating that in the case of laying a first synthetic resin and a second synthetic resin on a joint panel as shown in FIG. 2, both the top surface and the bottom surface are bulged by injecting air into a space between the first synthetic resin and the second synthetic resin.

FIG. 5 is a view illustrating that in the case of laying a first synthetic resin and a second synthetic resin on a joint panel as shown in FIG. 2, both the top surface and the bottom surface are bulged by injecting air into a space between the first synthetic resin and the second synthetic resin.

Referring to FIG. 5, a first synthetic resin 520 and a second synthetic resin 530 laid on a joint panel 510 are joined at a plurality of points. In this configuration, if air is injected between the first synthetic resin 520 and the second synthetic resin 530, the first synthetic resin 520 expands downward and the second synthetic resin 530 expands upward. And the plurality of points joined with the first synthetic resin 520 and the second synthetic resin 530 rises upward from the joint panel 510. Especially, according to the inventive concept, as the plurality of points rises upward from the joint panel 510, even each point main maintain cushion to provide more comfort for a user and to allow the inner body to be further protected from an external impact.

Accordingly, the cover shown in FIG. 5 may have bulged patterns which provide considerable solid perception to users. This is because the bulged patterns are formed on both the top and the bottom.

Additionally, although FIG. 5 does not illustrate a third synthetic resin, the third synthetic resin may be disposed on the second synthetic resin 530 or may be interposed between the joint panel 510 and the first synthetic resin 520. The inventive concept may rise points by injecting air into a space between, highly elastic, the first synthetic resin 520 and the second synthetic resin 530 wherever the third synthetic resin is disposed.

Figure 6:
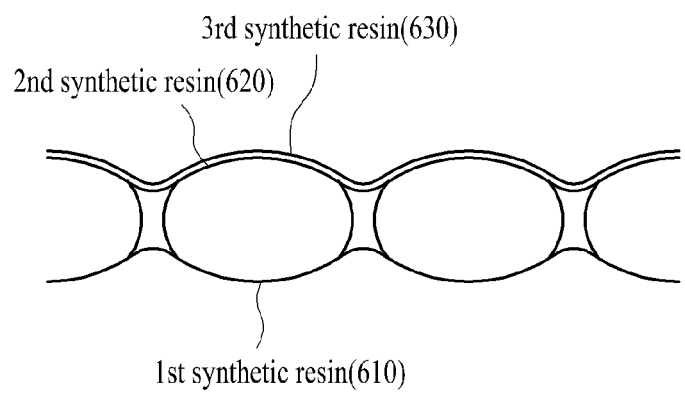
FIG. 6 enlarges points of forming joints.

FIG. 6 enlarges points of forming joints.

Referring to FIG. 6, if air is injected into a space between a first synthetic resin 610 and a second synthetic resin 620, joined points also expand upward and downward. Accordingly, as shown in FIG. 6, the first synthetic resin 610 has bulged patterns in a direction to a joint panel (not shown) and the second synthetic resin 620 has bulged patterns in a direction to a third synthetic resin 630. A cover fabricated in this manner is more protective from an external impact, as well as providing esthetic appreciation and solid perception better than the covers fabricated by the manners shown in FIGS. 3 and 4.

Although FIG. 6 is illustrated as the third synthetic resin 630 is disposed on the second synthetic resin 620, the inventive concept may dispose the third synthetic resin 630 under the first synthetic resin 610.

Figure 7:
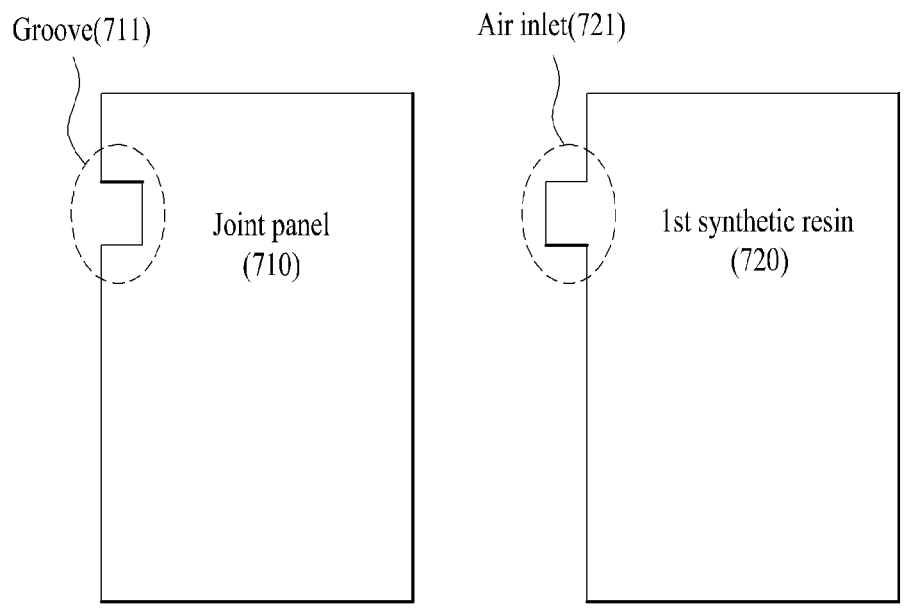
FIG. 7 is a view of a first synthetic resin having an air inlet and a joint panel with a groove.

FIG. 7 is a view of a first synthetic resin having an air inlet and a joint panel with a groove.

Referring to FIG. 7, at least one groove 710 is formed at the edge of a joint panel 710. A manufacturer disposes a first synthetic resin 720, a second synthetic resin and a third synthetic resin (not shown) on a joint panel 710 and then performs joints at a plurality of points. During this, the first synthetic resin 720 has at least one projection 721 and the projection 721 is used for air injection.

For example, after inserting an air injector between an air inlet 721, which is a projection part of the first synthetic resin 720, and a projection part of the second synthetic resin, the manufacturer injects air into a space between the first synthetic resin 720 and the second synthetic resin. During this, with the air inlet 711 of the joint panel 710, the air inlet 721 which is the projection part of the first synthetic resin 720, and the projection part of the second synthetic resin, the manufacturer may more easily inject air thereinto.

Figure 8:
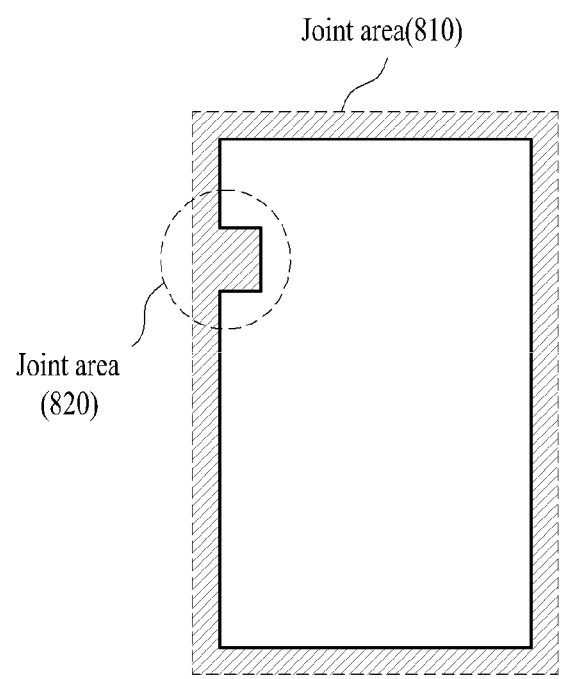
FIG. 8 is a view of a jointing feature in an edge of a joint panel and a peripheral area of a groove after air injecting.

FIG. 8 is a view of a jointing feature in an edge of a joint panel and a peripheral area of a groove after air injecting.

Referring to FIG. 8, after injecting air into a space between a first synthetic resin and a second synthetic resin, a manufacturer removes a projection part from the first synthetic resin and a projection part from the second synthetic resin. Then, the manufacturer joins the edge of a joint panel.

During this, as shown in FIG. 8, a joint area 810 is relatively thin but a joint area 820 including a groove of the joint panel is relatively thick. Due to this joint feature, air injected into a space between the first synthetic resin and the second synthetic resin is maintained safely.

Figure 9:
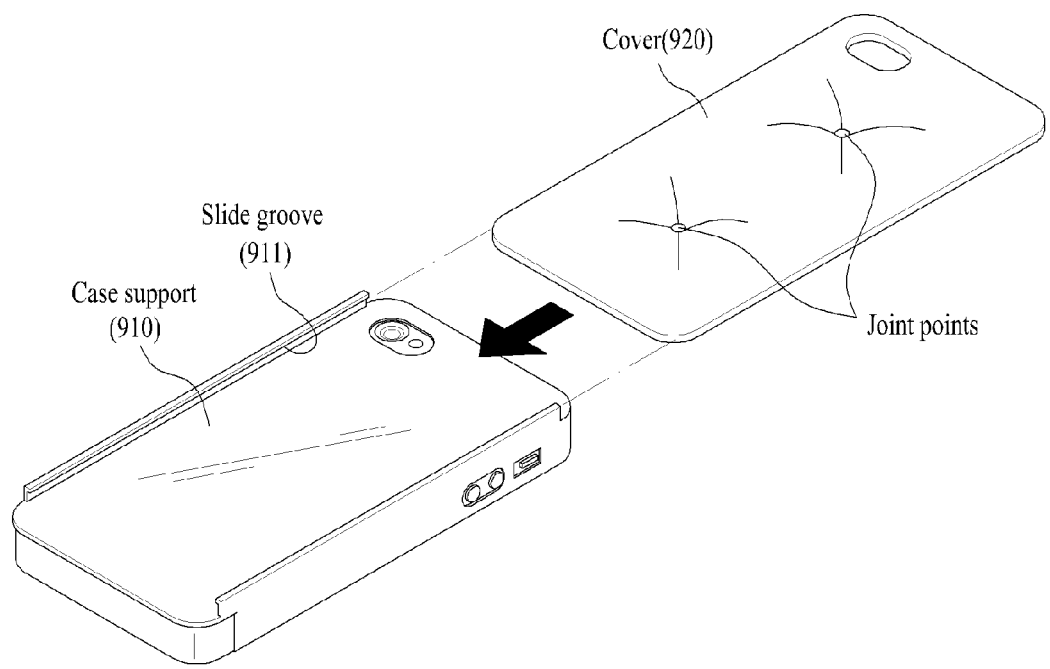
FIG. 9 is a view of an electronic device case according to an embodiment of the inventive concept.

FIG. 9 is a view of an electronic device case according to an embodiment of the inventive concept.

Referring to FIG. 9, an electronic device case includes a case support 910 and a cover 920. The case support 910 and the cover 820 may be joined or detached in a sliding mode. For example, a user may selectively attach one of covers to the case support 910 or may even replace the attached cover with another one. Additionally, the case support 910 includes a slide groove 911 to allow the cover 920 to be joined or detached in the sliding mode. An electronic device case according to the inventive concept may be applicable to all kinds of living design matters including fashionable foods such as bags, illuminators, clothing, and pouches.

The cover shown in FIG. 9 also includes a plurality of joint points as described above and has a bulged surface with a plurality of bulged patterns. To fabricate the cover 920, the aforementioned descriptions through FIGS. 1 to 8 may be referred without duplication of explanation.

Modes of Embodiments

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

INDUSTRIAL APPLICABILITY

Embodiments of the inventive concept provide an electronic device case or diary cover having a bulged surface.

Additionally, embodiments of the inventive concept provide an electronic device case or diary cover having bulged surfaces on both the top and the bottom by injecting air into a first synthetic resin and a second synthetic resin which are elastic. Additionally, as a diary cover or electronic device cover has bulged surfaces on both the top and the bottom, the bulged surface is more solidly designed.

Additionally, embodiments of the inventive concept provide bulged surfaces on both the top and the bottom in a diary cover or electronic device case for rigidity to external impact and improved elasticity.

Additionally, embodiments of the inventive concept provide a groove in a joint panel to facilitate air injection between a first synthetic resin and a second synthetic resin.

What is claimed is:

1. A diary with a plurality of record bundles and a cover enclosing the bundles,
   wherein the cover comprises:
   a joint panel;
   an elastic first synthetic resin laid on the joint panel;
   an elastic second synthetic resin laid on the first synthetic resin; and
   a third synthetic resin interposed between the first synthetic resin and the joint panel or disposed on the second synthetic resin, and formed different from the first synthetic resin and the second synthetic resin in material, wherein the first synthetic resin, the second synthetic resin, and the third synthetic resin are joined at a plurality of points to allow the cover to have a bulged surface and air is injected into a space between the first synthetic resin and the second synthetic resin.

2. The diary of claim 1, wherein air is injected into the space between the first synthetic resin and the second synthetic resin to detach the plurality of points from the joint panel.

3. The diary of claim 1, wherein the cover comprises the plurality of points detached from the joint panel by expanding the first synthetic resin and the second synthetic resin in opposite directions each other through the air injected into the space between the first synthetic resin and the second synthetic resin.

4. The diary of claim 1, wherein the first synthetic resin and the second synthetic resin are formed of polyurethane,
wherein the third synthetic resin is formed of polyvinyl chloride.

5. The diary of claim 1, wherein the first synthetic resin, the second synthetic resin, and the third synthetic resin are joined at the plurality of points and an edge of the joint panel in a high frequency joint mode,
wherein the joint panel comprises at least one groove to allow the air to be injected into the space between the first synthetic resin and the second synthetic resin,
wherein the first synthetic resin, the second synthetic resin, and the third synthetic resin are more widely joined at the at least one groove that at other areas.

6. An electronic device case comprising:
a case support and a cover joined with or detached from the case support,
wherein the case support comprises a groove for allowing the cover to slide,
wherein the cover comprises:
a joint panel;
an elastic first synthetic resin laid on the joint panel;
an elastic second synthetic resin laid on the first synthetic resin; and
a third synthetic resin interposed between the first synthetic resin and the joint panel or disposed on the second synthetic resin, and formed different from the first synthetic resin and the second synthetic resin in material,
wherein the first synthetic resin, the second synthetic resin, and the third synthetic resin are joined at a plurality of points to allow the cover to have a bulged surface and air is injected into a space between the first synthetic resin and the second synthetic resin.

7. The electronic device case of claim 6, wherein air is injected into the space between the first synthetic resin and the second synthetic resin to detach the plurality of points from the joint panel.

* * * * *